United States Patent [19]
Kumagai

[11] Patent Number: 5,267,324
[45] Date of Patent: Nov. 30, 1993

[54] IMAGE COMPARISON METHOD

[75] Inventor: Ryohei Kumagai, Tokyo, Japan

[73] Assignees: Ezel, Inc., Tokyo; Sharp Corporation, Osaka, Japan

[21] Appl. No.: 965,054

[22] Filed: Oct. 22, 1992

Related U.S. Application Data

[63] Continuation of Ser. No. 724,928, Jul. 2, 1991, abandoned.

[30] Foreign Application Priority Data

Jul. 5, 1990 [JP] Japan ............................ 2-177791

[51] Int. Cl.$^5$ ............................................. G06K 9/00
[52] U.S. Cl. ............................................. 382/4; 382/5
[58] Field of Search ................... 382/4, 5, 21; 356/71

[56] References Cited

U.S. PATENT DOCUMENTS

| | | | |
|---|---|---|---|
| 4,947,442 | 8/1990 | Tanaka et al. | 382/5 |
| 5,040,224 | 8/1991 | Hara | 382/4 |
| 5,109,428 | 4/1992 | Igaki et al. | 382/5 |

FOREIGN PATENT DOCUMENTS

| | | |
|---|---|---|
| 043988 | 1/1982 | European Pat. Off. . |
| 339527 | 11/1989 | European Pat. Off. . |
| 59-62983 | 10/1984 | Japan . |

OTHER PUBLICATIONS

Pattern Recognition, Pergamon Press, A Syntactic Approach to Fingerprint Pattern Recognition, B. Moayer and K. S. Fu, 1975, vol. 7, pp. 1-23.

Second USA-JAPAN Computer Conference, Fingerprint Identification System, Ko Asai, Yukio Hoshino, Naoki Yamashita and Seiichi Hiratsuka, 1975, pp. 1-4-1 to 1-4-6.

Primary Examiner—Michael T. Razavi
Assistant Examiner—Yon J. Couso
Attorney, Agent, or Firm—Cushman, Darby & Cushman

[57] ABSTRACT

A method for comparing two images including ridges with each other, comprising steps from i) to iv).

i) Calculating density value of each pixel of an image to be examined and reference image; ii) detecting a direction with minimal change between each pixel and adjacent one, concerning to each pixel; iii) dividing the image to be examined and reference image, calculating an index according to the direction with minimal change as to each block; iv) using the index, it is judged if the image to be examined and reference image substantially coincide to each other.

11 Claims, 5 Drawing Sheets

IMAGE COMPARISON METHOD

This is a continuation of application Ser. No. 07/724,928, filed on Jul. 2, 1991, which was abandoned upon the filing hereof.

FIELD OF THE INVENTION

The present invention relates to a method for comparing images including ridges, as applied to a fingerprint verification system.

BACKGROUND OF THE INVENTION

The process of a conventional verification method is as follows:
i) An image including fingerprint ridges is binarized;
ii) A ridge pattern is obtained by thinning the binarized image;
iii) Branches, edge points and curvature from the ridge pattern are extracted as main characteristics;
iv) A sample image (fingerprint image to be examined) is compared with a master image (reference fingerprint image).

SUMMARY OF THE INVENTION

In the conventional method outlined above, the quality of the ridge pattern used for extracting characteristics affects verification precision. Therefore, complete fingerprints have to be obtained by accurately positioning a finger when a sample image is input to a conventional fingerprint verification system. There have been a lot of restrictions on inputting a sample image. The present invention alleviates this problem and has an object to provide a comparison method for images having ridges which can ease many input restrictions.

An image comparison method according to the present invention is characterized in the following steps:
i) detecting a density value of each pixel in an image to be examined and in a reference image;
ii) for each pixel, detecting a direction to an adjacent pixel having a minimal change of density value;
iii) dividing the image to be examined and the reference image into plural blocks;
iv) for each block, calculating an index characterizing a direction for which pixels have minimal density changes;
v) judging whether the image to be examined coincides to the reference image using indices of step iv).

A second comparison method according to the present invention performs as follows:
i) detecting the density value of each pixel in an image to be examined and a reference image;
ii) for each pixel, detecting a direction to an adjacent pixel having a minimal change of density value;
iii) calculating the ratio of the direction with minimal change in the above concerning to the image to be examined and reference image;
iv) judging if the image to be examined substantially coincides to the reference image using the ratio of step iii).

As for an image comparison method of the present invention, comparison judgment over a wide view is performed, with maximal use of information in an image by processing input image of gray-level as it is, and by processing the image in every block.

BRIEF DESCRIPTION OF THE DRAWINGS

FIG. 4 (II) shows a histogram of minimum density change directions of pixels in area "II" in FIG. 3.

DETAILED DESCRIPTION OF THE PREFERRED EMBODIMENTS

Hereinafter, an embodiment of an image comparison method of the present invention is described with reference to the attached drawings.

Figure 1:
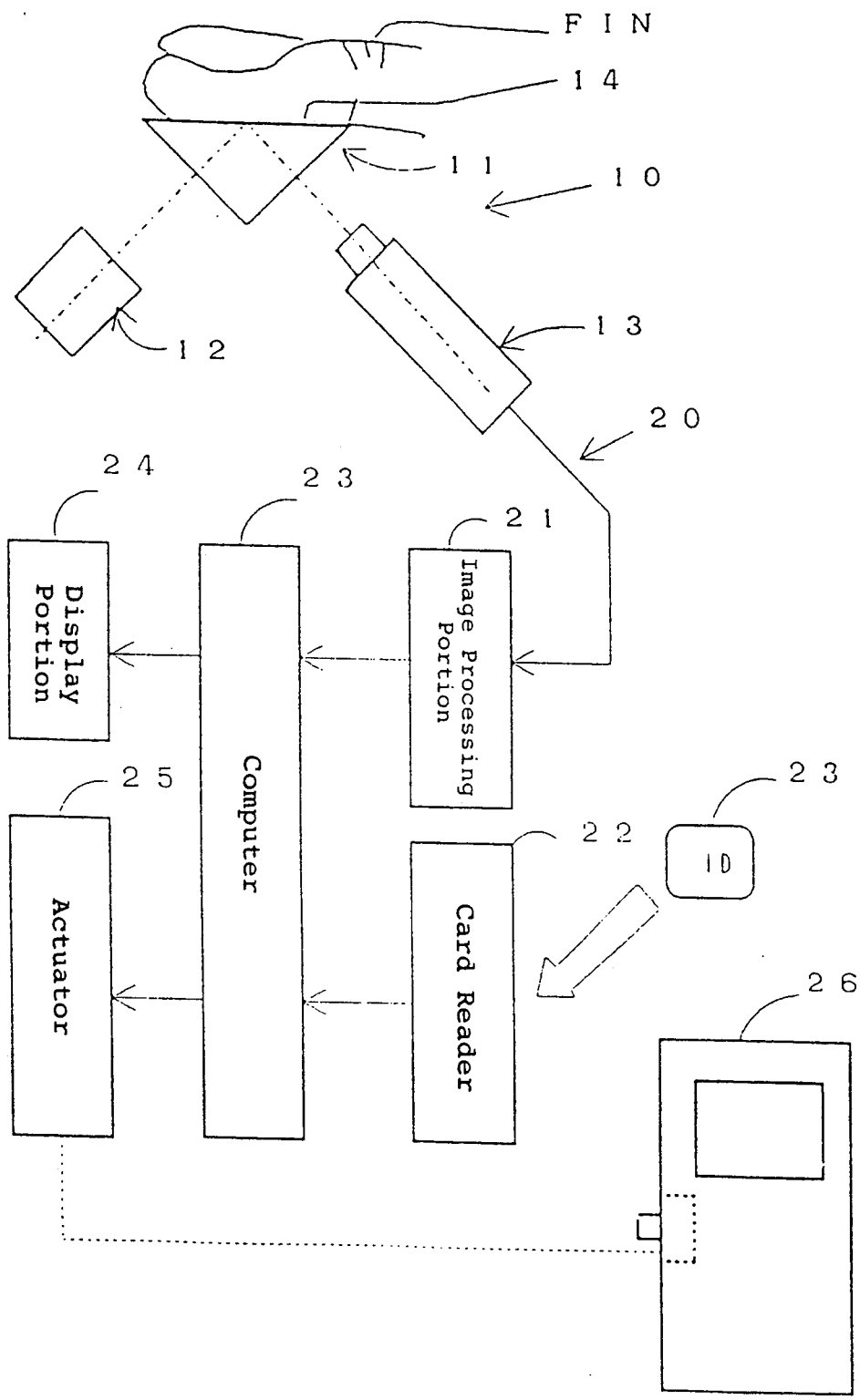
FIG. 1 shows the block diagram of a fingerprint verification system using the image comparison method of the present invention.

FIG. 1 shows a fingerprint verification system using an image comparison method of the present invention. The fingerprint verification system comprises an image input system 10 and a comparison system 20. The image obtained by the image input system 10 is compared in the comparison system 20. Image input system 10 projects light from a light source 12 onto a right angled prism 11. A CCD camera 13 detects the reflected light. A surface 14 of prism 12 is the detecting surface. FIN of a finger to be detected is touched to surface 14. When a finger FIN is not touched, light is all reflected and a white image is detected by CCD camera 13.

Figure 2:
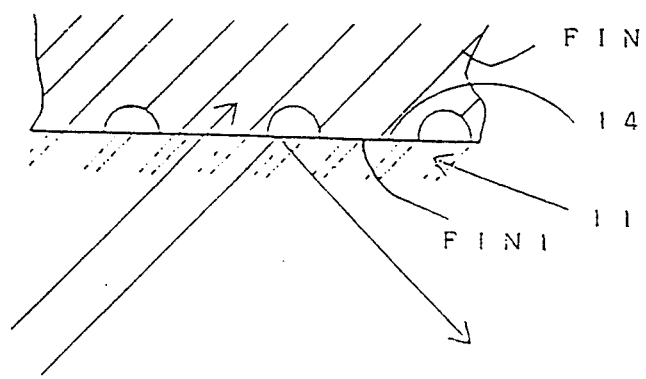
FIG. 2 shows the diagram of the part touched a finger on the slope of right prism.

The refractive index of the surface of the prism is changed at the points of the surface touched by a finger FIN 1 (i.e., the ridges of a fingerprint). As illustrated in FIG. 2, light passes through such surface points without refraction. Therefore, the ridges of the fingerprint are input to the CCD camera as dark lines.

Comparison system 20 includes an image processing portion 21 and card reader 22. By inserting an ID card 23 into the card reader 22, master data for the person to be examined is read out, and data input from the image input system 10 is compared with the master data. The comparison is executed in a computer 23. The comparison result is indicated on a display portion 24. The lock of a door 26 is released by an actuator 25 and the door can be opened when it is determined that the two fingerprints coincide to each other. Alternate methods can be adopted for specifying master data, such as input of an ID number from a keyboard by the person to be examined.

Figure 3:
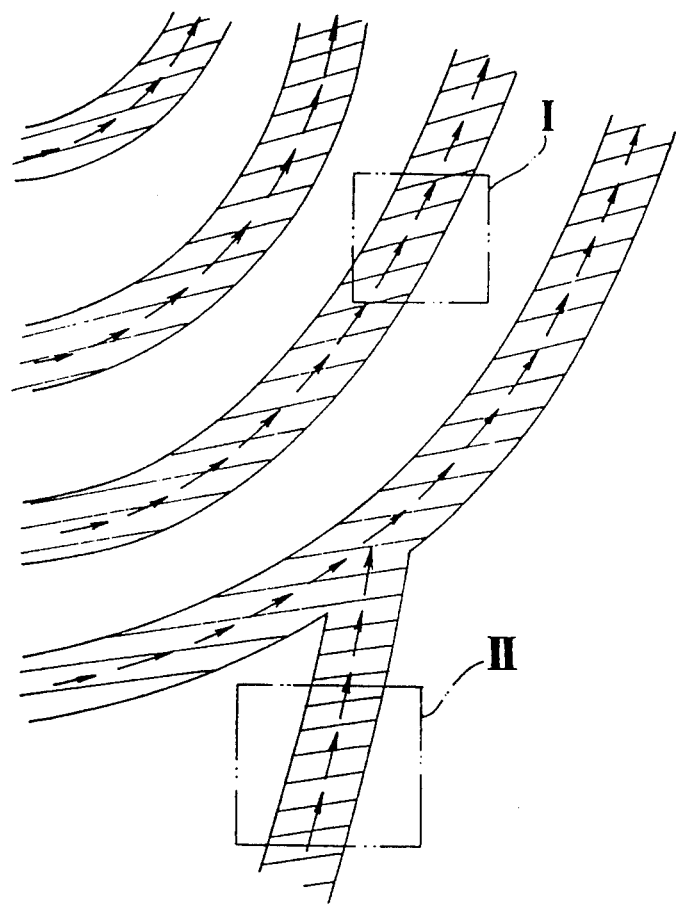
FIG. 3 shows an example of ridges of a fingerprint.
Figure 4:
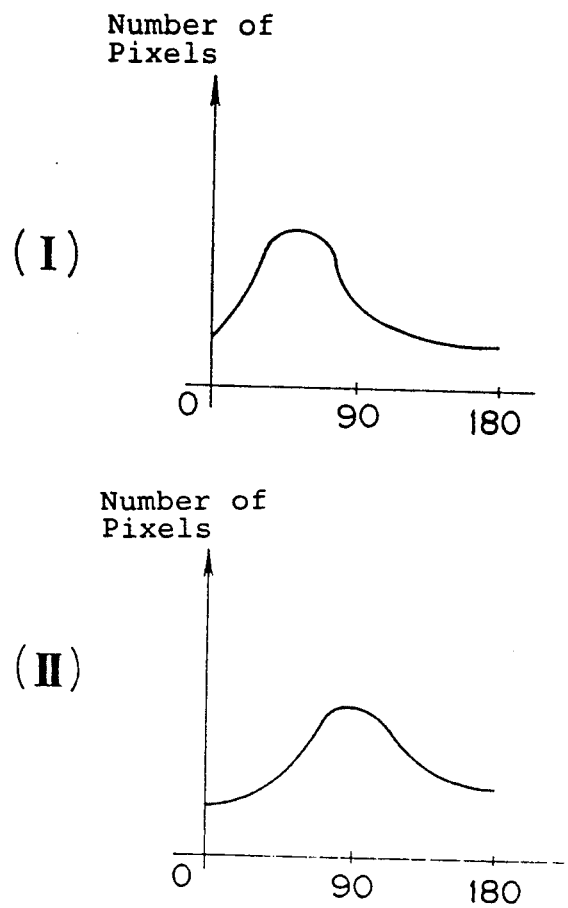
FIG. 4 (I) shows a histogram of minimum density change directions of pixels in area "I" in FIG. 3.

A histogram of directions is used as an index of direction for an area of an image. FIG. 3 illustrates ridges of a fingerprint, with arrows indicating directions of minimum density change. In area I, for example, most pixels have a direction of minimum density change inclined at a 45° angle (measured counterclockwise from horizontal). Histogram I of FIG. 4 illustrates the distribution of directions for area I. Similarly, most pixels in area II have a direction of minimum density change close to 90°. Histogram II of FIG. 4 illustrates the distribution of directions for area II. The direction of minimum density change can be conceptualized as a direction having a minimum partial differential of density. The following processes are executed to obtain such histograms.

First, a density value is detected for each pixel in a master image of a fingerprint image. The density value is stored in the memory of computer 23 as a master fingerprint image to be a reference for comparison with a sample image.

Figure 5:
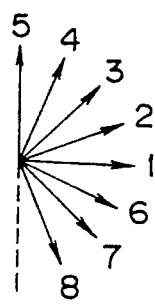
FIG. 5 a diagram illustrating the direction of a partial differential.

Next, partial differential values of densities among adjacent pixels is calculated for each pixel. Here, adjacent pixels include not only the pixels immediately adjacent to the one being processed, but also ones within a few pixel distances. Partial differences are calculated for pixels located in a range of 157.5° as shown in FIG. 5, i.e., the horizontal direction (number 1), directions rotated 22.5° counterclockwise in sequence from the horizontal direction (numbers 2 3, 4 and 5) and directions rotated 22.5° clockwise in sequence from the horizontal direction (numbers 6, 7 and 8). Using x-coordinates in the horizontal direction and y-coordinates in the vertical direction, and assuming the change of density to be $\Delta d$, "z" (partial differential) is calculated as:

$$z = \frac{\Delta d}{\Delta x + \Delta y}$$

Partial differential values from a digital image are discrete—especially with respect to the distance element. It may be necessary to adopt relatively large distances for some directions. When the distance becomes too large, the differential is taken between one ridge and another ridge beyond a trough, and the fingerprint ridge characteristics is lost. Therefore, small distance values are to be adopted as much as possible, even when direction precision is enhanced. Image input system 10 in FIG. 1 needs amendment for elements in the Y direction in the image to be input to the CCD camera 13 in order to observe the fingerprint from the slant direction of 45°. Good results are obtained by using distances of 0° ($\Delta x=2$, $\Delta y=0$), 22.5° ($\Delta x=2$, $\Delta y=1$), 45° ($\Delta x=2$, $\Delta y=2$) and 67.5° ($\Delta x=2$, $\Delta y=3$) as the distances of partial differential considering the amendment.

When calculating partial differential values for a series of directions shown in FIG. 5, the smallest value is stored in memory by comparing the smallest partial differential already calculated with each newly calculated value. Therefore, the minimum partial differential value is stored in the memory when the calculations for 8 directions is completed. The minimum differential values for all pixels is calculated by performing the process for each pixel.

The number corresponding to the "direction" of the newly calculated partial differential value (the numbers from 1 to 8 in FIG. 5) is stored in the memory in image processing portion. Consequently, the direction with the minimum partial differential value is calculated for all pixels, and the distribution of directions with the minimal partial differential values is obtained for the whole image. In this way, the information of the original image can be used to maximum advantage, as direction elements from every part of image are extracted directly from a gray-level image.

When the distribution of directions with the minimal partial difference value is obtained in a sample image, it is possible to detect the trends of the fingerprint ridges. Fingerprint verification can be performed by comparing the distribution of a sample image with that of the master image. That is, using direction data obtained from every pixel in both a sample image and master image, the data is compared. The fingerprint comparison can be executed over a full image without dividing it into blocks. That is, a sample image can be judged to coincide with a master image when more than 80% of the pixels coincide in direction.

In the preferred embodiment, the image is divided into plural blocks, and an index is calculated for the directions of the minimal values. The sample image is compared with the master image using the index. This method is adopted to compare sample image and master image over a wide area.

Figure 6:
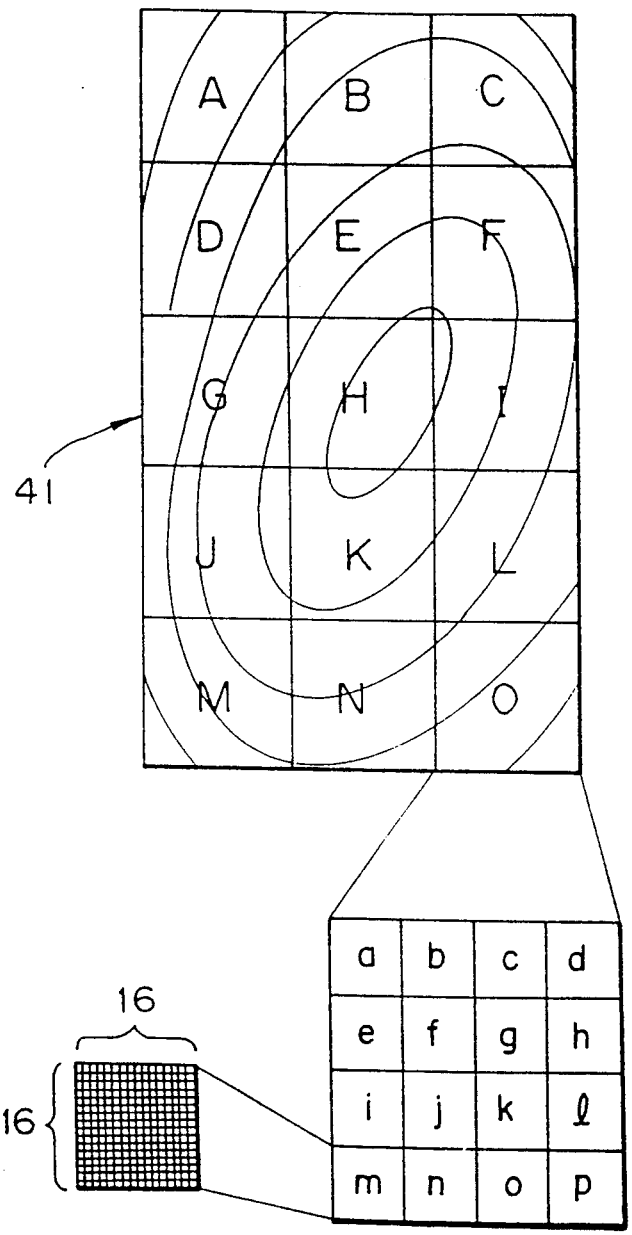
FIG. 6 is a diagram illustrating a method of dividing a fingerprint image into blocks.

FIG. 6 shows a way to divide a fingerprint 41 into blocks. The image 41 is divided into 15 blocks (A to O), each of which are divided into 16 subblocks ("a" to "p") comprised of $16 \times 16$ pixels. In the present embodiment, a sample image is compared with a master image using characteristic values as discussed below.

A total variance is calculated in each subblock of "a" to "p". It is defined by the following formula:

$$\begin{aligned} \text{Total Variance} &= \text{(Variance between Classes)} + \\ &\quad \text{(Variance within Classes)} \\ &= \sin^2(\Theta/2) + (Vm + Vs)/2 \end{aligned}$$

In the formula above, $\Theta$ is an angle between direction codes (as discussed below). Vm is a variance within classes in each block of a master image. Vs is a variance within classes in each block of a sample image. In the present embodiment, total-variance-RE is defined as the remainder left when the total variance (defined by the formula above) is subtracted from 1. That is, total-variance-RE is defined by the formula below:

$$\begin{aligned} RE &= 1 - \sin^2(\Theta/2) - (Vm + Vs)/2 \\ &= \cos^2(\Theta/2) - (Vm + Vs)/2 \end{aligned} \quad (1)$$

Figure 7:
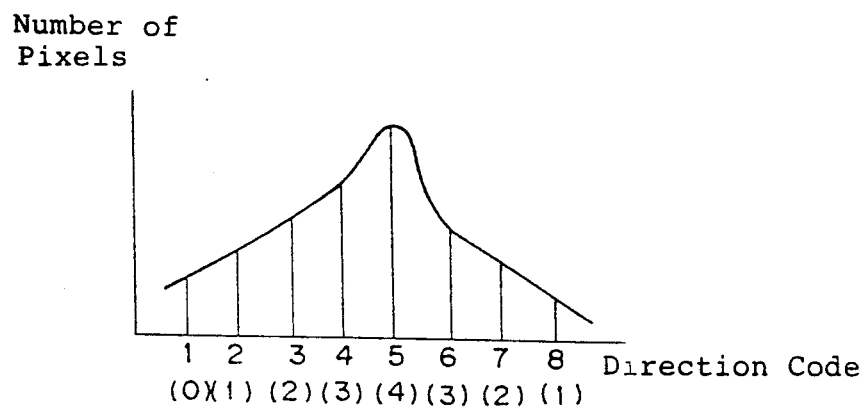
FIG. 7 shows a histogram of pixels having coincident direction codes.
Figure 8:
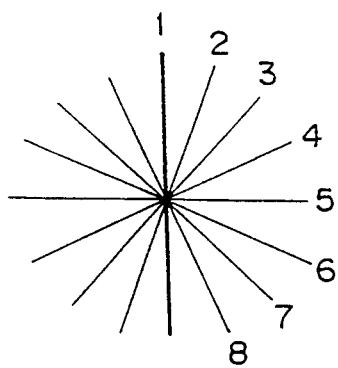
FIG. 8 is a diagram illustrating direction codes.

Variances within classes Vm in the master image and Vs in the sample image are calculated in order to calculate the total-variance-RE defined by formula (1). They are described with reference to FIG. 7 and FIG. 8. FIG. 7 shows a histogram of the number of pixels detected as having each direction code (as determined from differential values). FIG. 8 shows the definition of direction codes. The direction code in the vertical direction is "1" and it increases up to "8" as the direction rotates 22.5° clockwise from "1".

Deciding the direction code "1" to be a provisional center point, direction lag is calculated in comparison with direction code "1". (As discussed below, the provisional center is varied, and direction lags calculated with respect to multiple provisional centers.) The direction lags are 1, 2, 3, 4, 3, 2 and 1 for direction codes "2", "3", "4", "5", "6", "7" and "8", respectively (shown in parentheses in FIG. 7). As there is no reference, direction distinction between clockwise or counterclockwise, lags are the same for direction codes "2" and "8", "3" and "7", and "4" and "6".

A weighted value T is calculated for a subblock. The histogram shows that each direction code has a corresponding number of pixels with that direction code. For each direction code, a weighting factor is determined as $\sin^2(\Theta)$ where $\Theta$ is the angle difference (direction lag) between the direction code and the provisional center point. The weighted value T is the sum of the products of the weighting factors (one for each direction code)

times the numbers of pixels having that direction code. The variance within classes is calculated by dividing the weighted value T by 256 (the number of pixels in a subblock). Thus, the variance within classes V can be expressed by the following equation:

$$V = \frac{1}{n} \sum_{d=1}^{m} [\sin^2(D - d) \cdot N(d)]$$

where n is a number of pixels in a subblock, d is a direction code, m is a number of direction codes and N(d) is a number of pixels having direction d.

Each of the eight directions is taken in turn as the provisional center. Eight variances are calculated, one for each provisional center. The provisional center having lowest variance is taken to be the direction of the subblock, and the lowest variance is taken as the variance for the subblock. In this way, variances are determined for each subblock "a" to "p".

Variances Vm and Vs from equation 1 are determined for each block from variances of the respective subblocks. The variance of a block is the mean value of the variances of subblocks. Vm is the variance of a block taken from a master image. Vs is the variance of a block taken from a sample image. Similarly, the mean value of directions from each subblock is taken as the direction of the block.

The value $\Theta$ in equation 1 is the angle difference between the direction of a block in the master image and the direction of a block in a sample image. The angle may be determined as the numeric difference between direction codes (e.g., direction 7 minus direction 6 gives a difference of 1) and then converted into the equivalent number of degrees.

Direction lag is calculated as $\cos^2(\Theta/2)$ and is used in formula (1). The difference between the direction codes of the master image and the sample image in every block provides the angle $\Theta$. For example, when the difference between direction codes of the master and sample images is 1, $\Theta$ is 22.5° and the direction lag is 0.96. When the difference is 2, direction lag is 0.85 for a $\Theta$ of 45°. When the difference is 3, direction lag is 0.69 for a $\Theta$ of 67.5°. When the difference is 4, direction lag is 0.5 for a $\Theta$ of 90°.

Using direction lags (a measure of variance between classes) and variance within classes Vm and Vs (obtained as above), total-variance-RE can be calculated through formula (1) for every block A to O. Total-variance-RE ranges from 0 to 1. For a sample image closely resembling a master image, it is close to 1. For example, when a sample image almost coincides with a master image, total-variance-RE is equal to or more than 0.8 in all blocks from A to O. On the other hand, when a sample image does not coincide with the master image, total-variance-RE is less than 0.7 in most blocks from A to O. When a sample image almost coincides to a master image but partially does not, total-variance-RE is equal to or more than 0.8 in almost all the blocks, but it is less than 0.7 in some of the blocks.

Correlation is calculated next as a characteristic. It is defined as the following formula:

$$COR = \frac{\sum_{i=1}^{8} x(\Theta_i) \times X(\Theta_i)}{\sqrt{\sum_{i=1}^{8} x^2(\Theta_i) \times \sum_{i=1}^{8} X^2(\Theta_i)}} \quad (2)$$

where, COR is correlation, $x(\Theta_i)$ is the number of pixels in the master image having direction $\Theta$ and $X(\Theta_i)$ is the number of pixels in the sample image having direction $\Theta_i$.

The correlation of a block is the mean value of the correlations of the respective subblocks. The correlation ranges form 0 to 1: as a sample image resembles the master image, it becomes close to 1.

Distance between classes is calculated in every block from A to O. The distance between classes is defined by the following formula:

$$DG = \frac{\sum_{i=1}^{8} \{x(\Theta_i) - X(\Theta_i)\}^2}{\sum_{i=1}^{8} x(\Theta_i) \times \sum_{i=1}^{8} X} \quad (3)$$

where, DG is distance between classes, $x(\Theta_i)$ is the number of pixels in the sample image having the direction of $\Theta_i$(deg), and $X(\Theta_i)$ is the number of pixels in the master image having the direction $\Theta_i$.

Distance between classes is calculated in each subblock from "a" to "p", and their mean value is the distance between classes of the corresponding block. Distance between classes changes from 0 to 1: as a sample image resembles the master image, it becomes close to 0.

As above, a total variance, correlation and distance between classes are calculated in every block from A to O of the master image and a sample image. For a judgment of substantial coincidence between the master image and a sample image, it is necessary for total variance to be equal to or more than 0.7, for correlation to be equal to or more than 0.96, and for distance between classes to be equal to or less than 0.1. In other words, when even one block is out of these limits, the sample image is judged to be different from the master image. In the fingerprint verification system shown in FIG. 1, the lock of the door 26 is released when a fingerprint to be examined (sample image) coincides with a reference fingerprint (master image). When a fingerprint to be examined is judged not to coincide, the person to be examined is required to input his fingerprint again, or a message denying entry is displayed without releasing the lock.

A fingerprint is not always within the ranges for all blocks A to O. For example, on a corner block, there is a possibility that pixel data in a subblock from "a" to "p" will be incomplete (less than 256 pixels). In such a case, the total variance, correlation and distance between classes are calculated by ignoring the pixel data in the incomplete subblock. When the ratio of invalid blocks is more than a predetermined value, the person to be examined is immediately required to input his fingerprint again. It is not necessary to use all the indexes of total variances, correlation and distance between classes. Only one or two of them may be used for a comparison of images.

As mentioned above, the present invention compares master image and sample image by i) calculating the direction with the minimal change of density value, and ii) calculating an index of direction for each block in each image. Therefore, each image can be compared over a wide view, and it is always possible to execute precise comparison on any quality of ridge pattern. That is, in the present invention, the limitations for inputting sample image are eased.

What is claimed is:

1. A method for identifying a ridge sample object as similar to a ridge master object comprising steps of:

illuminating the master object;

capturing a master image depicting ridges of the master object, the master image being represented by master ridge pixels;

detecting a master pixel direction having a minimum change in density from every one of a group of master ridge pixels, said master ridge pixels group including a majority of the master ridge pixels, to all pixels adjacent to and near every one of the master ridge pixels in said master ridge pixels group, thereby detecting a distribution of the master pixel directions having a minimum change in density for the entire master image based on the majority of master ridge pixels in said master ridge pixels group;

storing master pixel directions in a memory;

illuminating a sample object;

capturing a sample image depicting ridges of the sample object, the sample image being represented by sample ridge pixels;

detecting a sample pixel direction having a minimum change in density from every one of a group of sample ridge pixels, said sample ridge pixels group including a majority of the sample ridge pixels, to all pixels adjacent to and near every one of the sample ridge pixels in said sample ridge pixels group, thereby detecting a distribution of sample pixel directions having a minimum change in density for the entire sample image based on the majority of sample ridge pixels in said sample ridge pixels group;

detecting a measure of correspondence relating master pixel directions for a majority of master ridge pixels with sample pixel directions for a majority of sample ridge pixels; and determining whether the measure of correspondence satisfies a predetermined condition, thereby identifying the sample object as similar to the master object.

2. A method as in claim 1 wherein the master object is a finger.

3. A method as in claim 1 wherein the step of detecting a master pixel direction includes a step calculating a differential value between a master ridge pixel and a master local pixel.

4. A method as in claim 1 wherein the step of detecting a sample pixel direction includes a step calculating a differential value between a sample ridge pixel and a sample local pixel.

5. A method as in claim 1 further comprising steps of:

detecting a master block direction for each of a plurality of multi-pixel master blocks in the master image;

detecting a master block variance $V_M$ for each master block characterizing the variance of master pixel directions within the master block;

detecting a sample block direction for each of a plurality of multi-pixel sample blocks in the sample image, each sample block corresponding to a master block; and detecting a sample block variance $V_S$ for each sample block characterizing the variance of sample pixel directions within the sample block.

6. A method as in claim 5 wherein the step of determining whether the measure of correspondence satisfies a predetermined condition includes a step of determining whether the measure:

$$RE = \cos^2(\Theta/2) - (Vm + Vs)/2$$

is greater than a predetermined value for each of a plurality of corresponding sample blocks and master blocks where:

$\Theta$ is an angle between the sample block direction and the master block direction;

$V_M$ is the master block variance; and $V_S$ is the sample block variance.

7. A method as in claim 5 wherein the step of detecting a master block direction includes steps of:

i) detecting a master subblock direction for each of a plurality of multi-pixel master subblocks in the master block; and ii) determining an average value of master subblock directions as the master block direction.

8. A method as in claim 7 wherein the step of detecting a master subblock direction includes steps of:

for each of a number m or master pixel directions d measuring a count N(d) of master ridge pixels within a master subblock having the same master pixel direction;

calculating a weighted master value V(D) for each of a series of test directions D according to the formula:

$$V(D) = \frac{1}{n} \sum_{d=1}^{m} [\sin^2(D - d) * N(d)]$$

where:

D are test directions;

n is a normalized constant d are master pixel directions

N(d) are the number of pixels having direction d m is a count of master pixel directions; and selecting, as the detected master subblock direction, the minimum of values V(D).

9. A method as in claim 5 wherein the step of detecting a sample block direction includes steps of:

i) detecting a sample subblock direction for each of a plurality of multi-pixel sample subblocks in a sample block; and ii) determining an average value of sample subblock directions as the sample block direction.

10. A method as in claim 9 wherein the step of detecting a sample subblock direction includes steps of:

for each of a number m of sample pixel directions d measuring a count N(d) of sample ridge pixels within a sample subblock having the same sample pixel direction;

calculating a weighted sample value V'(D) for each of a series of test directions D according to the formula:

$$V(D) = \frac{1}{n} \sum_{d=1}^{m} [\sin^2(D - d) * N(d)]$$

where:

D are test directions;

n is a normalizing constant d are sample pixel directions

N(d) are the numbers of pixels having direction d m is a count of sample pixel directions;

selecting, as the detected sample subblock direction, the minimum of values V(D).

11. An apparatus for regulating access to a restricted region comprising:

a light source;

an optical path directing light from the light source to a measuring location at which an object having ridges can be positioned;

means for transforming an optical image to an electrical signal;

an optical path directing light from the measuring location to said transforming means;

image processing apparatus, responsive to said transforming means;

blocking means for preventing access to the restricted region; and releasing means for disabling the blocking means when receiving a signal from the image processing apparatus;

wherein the image processing apparatus comprises:

i) means for capturing a master image depicting ridges of a master object, the master image being represented by master ridge pixels, and for capturing a sample image depicting ridges of a sample object, the sample image being represented by sample ridge pixels;

ii) means for detecting a plurality of master pixel directions, one for each of a majority of the master ridge pixels, each master pixel direction indicating a direction having a minimum change in density from the master ridge pixel to all pixels adjacent to and near the master ridge pixel;

iii) means for storing the master pixel directions;

iv) means for detecting a plurality of sample pixel directions, one for each of a majority of the sample ridge pixels, each sample pixel direction indicating a direction having a minimum change in density from the sample ridge pixel to all pixels adjacent to and near the sample ridge pixel;

v) means for detecting a measure of correspondence relating master pixel directions for a majority of master ridge pixels with sample pixel directions for a majority of sample ridge pixels; and vi) means for signaling the releasing means when the measure of correspondence satisfies a predetermined condition.

* * * * *